INVENTORS
Carl S. Hoffman &
Kenneth L. Hulsing
BY
ATTORNEY

Dec. 25, 1962 C. S. HOFFMAN ET AL 3,069,926
CONNECTING ROD AND CRANKSHAFT CONNECTION
FOR INTERNAL COMBUSTION ENGINE
Filed Nov. 30, 1959 2 Sheets-Sheet 2

INVENTORS
Carl S. Hoffman &
BY Kenneth L. Kulsing

L. D. Burek
ATTORNEY

United States Patent Office 3,069,926
Patented Dec. 25, 1962

3,069,926
CONNECTING ROD AND CRANKSHAFT CONNECTION FOR INTERNAL COMBUSTION ENGINE
Carl S. Hoffman, Royal Oak, and Kenneth L. Hulsing, Plymouth, Mich., assignors to General Motors Corporation, Detroit, Mich., a corporation of Delaware
Filed Nov. 30, 1959, Ser. No. 856,066
15 Claims. (Cl. 74—580)

The present invention relates to connecting rod structures generally, and more particularly to a crankshaft bearing end of a connecting rod extending intermediate the piston and crankshaft of an internal combustion engine.

The invention is directed to a connecting rod of the type in which the crankshaft bearing end thereof is split transversely to form an arched bearing or bearing supporting portion and a bearing or bearing supporting strap or cap portion, such portions being secured together by two or more bolts and usually clamping split bearing halves therebetween. The invention contemplates a connecting rod of this type having an improved, more compact crankshaft bearing connection lowering the unit bearing loadings imposed thereon and increasing the designed crankshaft structural strength while permitting the design and use of a lighter, more compact crankcase and overall engine relative to those permitted by previous connecting rods of this type.

For illustrative purposes the invention is described and shown herein as embodied in a V engine wherein the connecting rods of transversely adjacent V'd cylinders are preferably mounted in side-by-side relation on the same crankpin. While the invention has particular utility in such an application, it is not considered to be so limited in its broader aspects being applicable to clamping rings generally. In the illustrative embodiment of the invention, the clamping bolt holes extending through the mating connecting rod and bearing strap intersect the bearing supporting surfaces thereof. The adjacent ends of the bearing halves supported by the rod and strap are notched to permit the insertion and removal of the clamping bolts. These clamping bolts are arcuately notched intermediate their ends on a radius slightly in excess of the common bearing supporting radius of the rod and strap. Such notching of the clamping bolts transposes the effective clamping axes thereof outwardly to equalize the effective clamping load distribution imposed on the mating surfaces of the rod, strap and bearing halves about planes passing through the effective bolt axes in parallel relation to the axis of the crankpin thereby preventing compressive distortion of the bearing supporting surfaces and halves. The arcuate notching of the clamping bolts further provides increased elasticity for maintaining the thread locking relation between the clamping bolts and the nuts threaded thereon in assembly and permits the use of the same clamping bolts in the assembly of the rod and strap prior to finishing the bearing halves and bearing supporting bore defined by the rod and strap.

The foregoing and other objects, advantages and features of the invention will be apparent from the following detailed description of a preferred embodiment thereof, reference being made to the accompanying drawings, in which.

Figure 1:
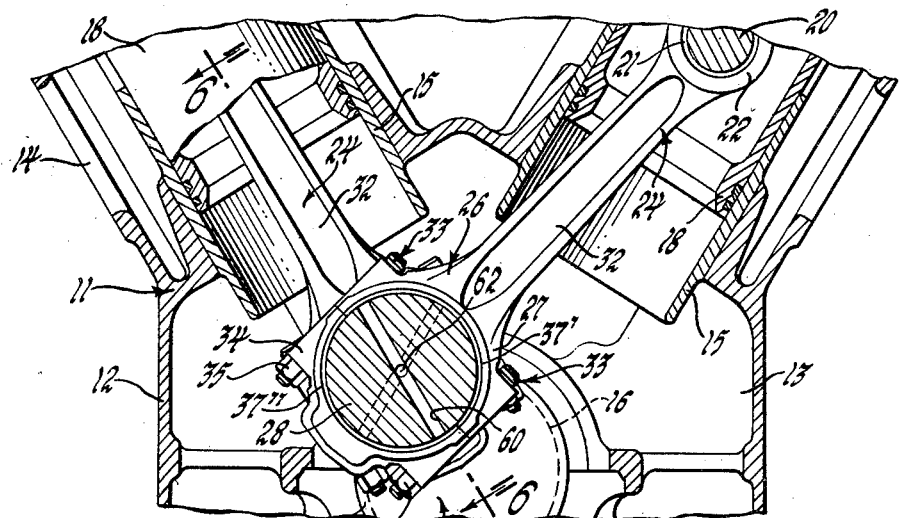
FIGURE 1 is a transverse sectional view showing a portion of a two-cycle internal combustion engine which is of V'd cylinder construction and embodies the preferred illustrative embodiment of the invention.
Figure 2:
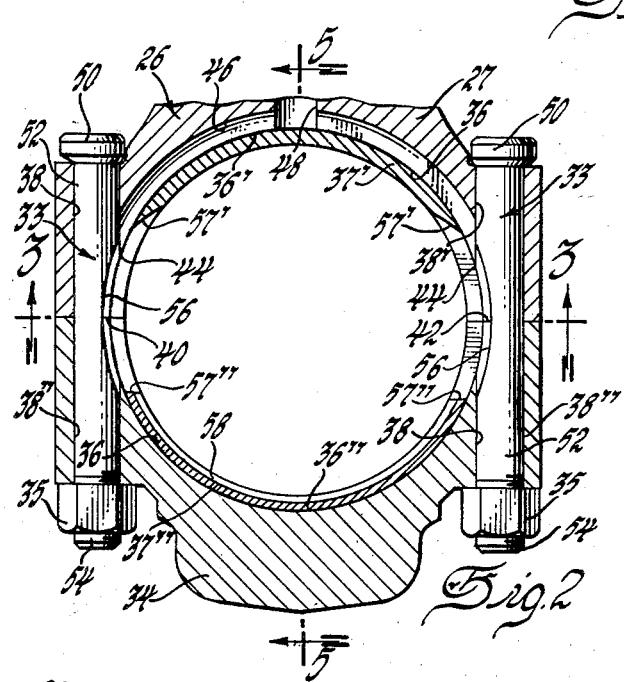
FIGURE 2 is an enlarged fragmentary view of the crankshaft bearing portion of a connecting rod constructed in accordance with the invention with portions thereof broken away and in section to show certain details thereof.
Figure 4:
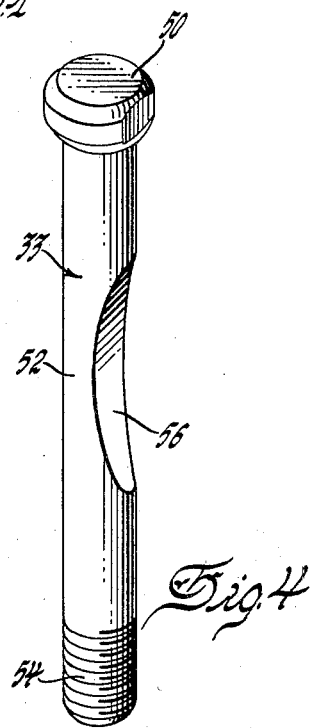
FIGURE 4 is a perspective view of one of the notched clamping bolts.
Figure 3:
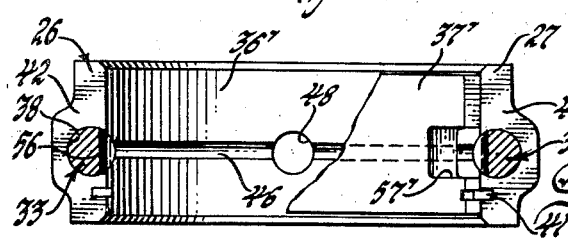
FIGURE 3 is a sectional view taken substantially on the line 3—3 of FIGURE 2.
Figure 5:
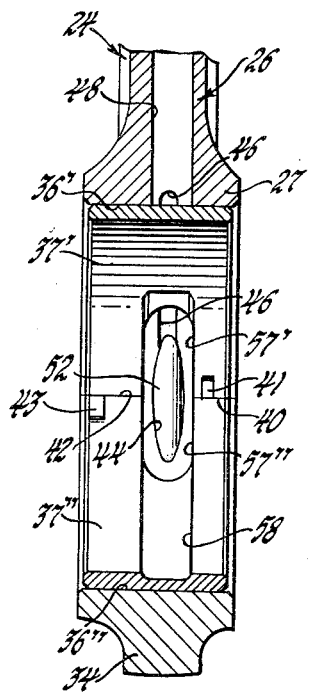
FIGURE 5 is a fragmentary sectional view taken substantially on the line 5—5 of FIGURE 2.
Figure 6:
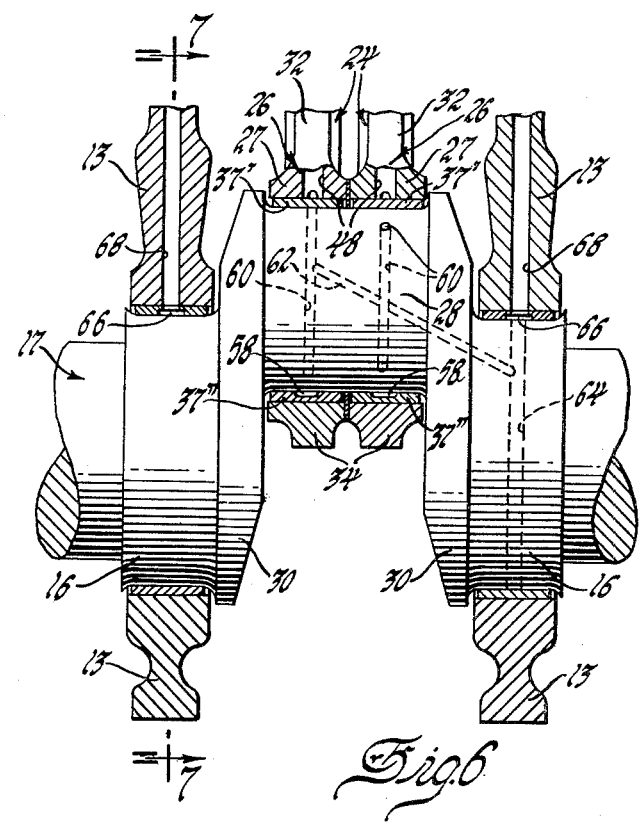
Figure 7:
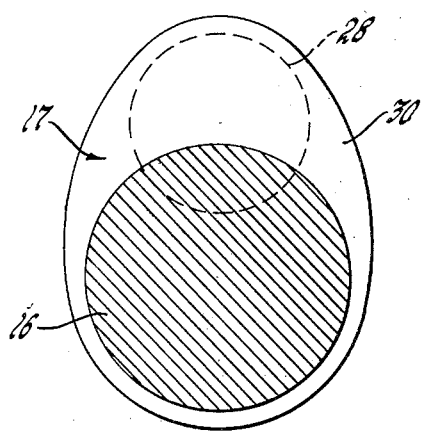

FIGURE 6 is a fragmentary sectional view taken substantially in the plane of the line 6—6 of FIGURE 1 and shows certain details of the crankshaft construction and journaling and of the side-by-side connecting rod, crankpin connection; and FIGURE 7 is an enlarged sectional view of the crankshaft taken substantially in the plane of the line 7—7 in FIGURE 6 and shows the crankshaft web and journal overlap permitted by using the connecting rods of the invention.

Referring more particularly to the drawings, the two-cycle V engine shown in FIGURE 1 has a cylinder block 11 including a crankcase defining portion 12 having longitudinally spaced main bearing supporting webs 13 extending transversely thereof. The several webs 13 suitably journal longitudinally spaced main journal portion 16 of a crankshaft 17. Two inline rows of cylinder defining liners 15 are mounted in the upper portion 14 of the cylinder block and are V'd radially of the crankshaft axis. A piston 18 is reciprocably mounted within each cylinder and carries a wrist pin 20 which is pivotally bushed at 21 to the smaller wrist pin end 22 of a connecting rod 24. The larger opposite end 26 of each connecting rod is constructed in accordance with the invention and is drivingly journaled on a corresponding crankpin journal 28. As best seen in FIGURES 6 and 7, the several crankpin journals 28 partially overlap the main crankshaft journal portions 16 and are supported therebetween by radially extending crankthrow webs 30.

To permit the same longitudinal cylinder spacing of a single row inline engine of identical cylinder bore dimension, thereby providing a V engine of substantially twice the power output but of substantially the same longitudinal length as the inline engine, each crankpin of the crankshaft preferably journals two connecting rod ends 26. The connecting rods thus mounted in side-by-side relation on each crankpin are connected to the pistons in transversely adjacent V'd cylinders of two cylinder rows. To accommodate this side-by-side mounting of the two connecting rods on a single crankpin while maintaining the same longitudinal spacing and axial dimension of the several main bearings, the cylinders in one bank are preferably staggered slightly behind those of the other bank and the crank ends of the connecting rods must necessarily be of reduced axial dimension. Within limits the longitudinal dimension of the crankpin may also be increased by corresponding reductions in the web thickness of the several crankthrows. To maintain main and crankpin bearing loads within acceptable peak and mean limits, however, the main and crankpin journals and the bearings therefor must necessarily be of increased diameter relative to the corresponding journals of the inline engine crankshaft.

To provide maximum interchangeability between a series of inline and V engines of substantially all basic engine components and subassemblies except the cylinder blocks and crankshafts and to permit corresponding and interchangeable machining of these major non-interchangeable components, the piston stroke and cylinder spacing with respect to the axis of the crankshaft in the several V engines should also be identical to corresponding dimensions of the inline engine. Such common dimensioning between the inline and V engines contributes substantially to crankcase and overall engine compactness and rigidity and permits the resultant V engine to be relatively light in relation to total power output. The necessarily increased diameter crankpin journals, however, presents a clearance problem between the lower ends of the cylinder liners and the arc swept by the connecting rod ends 26 and their associated clamping bolts.

The connecting rod assembly 24 of the illustrative V engine embodiment of the invention may be formed from a forged casting identical to or having substantially the same transverse peripheral outline as a conventional connecting rod for the corresponding inline engine thus insuring the desired and necessary crankcase dimensions and clearances. The connecting rod comprises a main rod portion 32 of I-section extending between the closed, bushing mounting hub at the wrist pin end thereof and a crankpin bearing supporting arch 27 formed at the opposite end thereof. Clamping bolts 33 and nuts 35 secure a bearing supporting cam member 34 to the arch of the main rod portion. The arch and cap are provided with semi-cylindrical surfaces 36' and 36", respectively, which upon assembly define a cylindrical bore 36 and support bearing halves 37' and 37".

The bearing cap member 34 is preferably cast and forged integrally with the crankpin bearing end of the main rod portion in the usual manner. After first finishing the forged casting to provide the desired axial thickness and finished end surfaces to the bearing ends 22 and 26, holes 38 are drilled in the end 26 or otherwise suitably finished therein to receive the clamping bolts 33. The rod end 26 is then diametrically split in a plane normal to the parallel axes of the holes 38 thus severing the bearing cap member from the main rod portion. After finishing the resultant opposed mating faces 40 and 42 of the bearing cap 34 and main rod arch 27, respectively, the bearing cap is again secured to the main rod portion by the clamping bolts 33 and nuts 35 and the crank pin bearing supporting bore 36 is then suitably finished. Since the desired crankcase and cylinder clearances dictate use of the same transverse peripheral dimensioning and bolt hole spacing of the connecting rod crankpin end as that of the conventional inline engine connecting rod, the finished bearing supporting bore 36 intersects and defines elliptical ports 44 with the clamping bolt holes 38' and 38" extending through the arch and cap, respectively. Following disassembly of the main rod portion 32 and the bearing cap member 34 after finishing bore 36, the arch portion 27 is provided with a groove opening on the bore 36 and extending circumferentially between the two port openings 44. This groove 46 is intersected intermediate its ends by a drilled passage 48 which extends centrally of the main rod portion for supply of lubricating oil to the wrist pin bushing. The mating ends of the bearing supporting arch and cap are also notched to receive tabs 41 and 43 extending outwardly of the bearings halves 37' and 37", respectively. The tabs 41 and 43 index and maintain the bearing halves in their proper assembled positions by abutting the mating faces 40 and 42 of the cap and arch, respectively.

In accordance with the invention, each clamping bolt 33 includes a head portion 50 which is suitably shaped and coacts with mating arch surfaces to index and non-rotatably key the bolt with respect to the bolt holes 38. A shank portion 52 extends axially from the head portion 50. In assembly, this shank portion extends through the bolt holes 38 and pilots the bearing arch and cap into proper crankpin bearing supporting relation. The ends of the bolts distal from the heads project from the bearing cap holes 38" and are externally threaded at 54 to receive the nuts 35. The shank of each bolt is arcuately notched intermediate its ends as indicated at 56 on a radius at least equal to and preferably exceeding that of the bore 36. This notching of the clamping bolts prevents cutting of the already finished and heat treated bolt during finishing of the bearing supporting bore 36. The resultant reduced bolt cross-section also provides thread locking elasticity which is normally afforded by reduced diameter lands on conventional clamping bolts for such connections. This notching of the bolt further serves to move the effective center line at this section of the bolt radially outwardly so that the areas of the mating faces 40 and 42 of the arch and cap and of the bearing halves lying radially inwardly and outwardly of a tangential plane passing through this effective center line are substantially equal thereby preventing compressive distortion of these mating surfaces with resultant ovalizing deflection of the bearing halves and the bearing supporting arch and cap which, as explained above, are of reduced section and rigidity relative to a conventional connecting rod of this type.

The mating ends of the crankpin bearing halves 37' and 37" are notched at 57' and 57" to permit insertion and removal of the connecting rod bolts 33. The lower bearing half is further provided with an oil distribution groove 58 opening on the journaled surface thereof and extending between the notches 57". The openings defined by the notches 57' and 57" are assembled in alignment with the ports 44 and are in continuous communication with the wrist pin oil supply passage 48 through the interconnecting branch passages defined between the groove 46 and the bearing half 36'. The notch defined openings are also in continuous communication through the oil distribution groove 58 with one of two oil supply passages 60 extending diametrically through each crankpin 28, one passage 60 being located in the transverse median plane of each connecting rod. As best seen in FIGURES 1 and 6, the diametrical crankpin passages 60 are connected by passages 62 extending obliquely of the journal and web portions to passages 64 which extend diametrically of the main journal portions 16. The ends of these main journal passages 64 may be either in continuous or sequential oil supply communication through oil distribution grooves 66 in the crankshaft journal bearings and suitable distribution passages 68 in the transversely extending crankcase webs 13 to the main oil supply pressure galley of the engine.

Even with the under-square bore and stroke V engine of the illustrative embodiment, the connecting rods of the invention permit the use of crankpin journals of substantially increased diameter which with a corresponding increase in main journal diameter provide substantial axial overlap of these journal portions thus permitting the necessary reduction in crankthrow web thickness while providing a substantially stronger and more rigid crankshaft capable of accommodating the increased output power of the V engine.

While the invention has been herein described for illustrative purposes with reference to its application to a V engine having substantial component interchangeability with an inline engine, its application is not so limited. The invention is equally applicable in the design of a relatively lightweight, compact inline engine having a single connecting rod connection for each crankpin. The invention is also applicable to existing inline and V engines for the purpose of reducing mean and pink bearing rods in certain high output applications, such as with turbocharging, thereby substantially improving bearing life. The resultant increase in the structural rigidity of the crankshaft may also be used to reduce high output deflective loadings which might otherwise be destructive on the main bearing webs and bearing caps.

In view of the foregoing, various changes and modifications might be made in the illustrative embodiment of the invention without departing from the spirit and scope thereof as defined in the following claims.

We claim:

1. In a V engine, a connecting rod structure for connecting two pistons to a common crankpin of a rotatably mounted crankshaft, said structure comprising, two connecting rods each being pivotally connectable at one end thereof to one of said pistons, the opposite end of each of said connecting rods defining a bearing supporting arch portion, a bearing supporting cap member mateable with each of said arch portions to define cylindrical bearing supporting surfaces said mating bearing caps and arch portions having aligned bolt holes therein intersecting and defining openings in the bearing supporting surfaces thereof, bearing segments interposed between and engaging said crankpin and said bearing supporting surfaces and having openings therein alignable with the bolt hole openings in said bearing supporting surfaces, clamping bolts mounted in said bolt holes and piloting said bearing cap members and arch portions in proper bearing supporting relation, said bearing openings permitting insertion and removal of said bolts in assembly and disassembly, each of said bolts having a shank portion extending through said arch and cap bolt holes and projecting therefrom, said shank portion having a longitudinally extending notch therein arcuately formed on a radius exceeding that of said bearing supporting bore, the arch projecting end of each bolt having a head thereon formed to index and non-rotatably key said bolt relative to said arch to maintain the notch in said bolt in spaced radial relation to the adjacent bearing supporting surface and opening therein, the end of each bolt projecting from said cap member having external threads thereon, and nuts threaded on said last-mentioned bolt ends and tensively loading said bolts to clamp said bearing halves, said arch and bearing cap together on said crankpin.

2. A structure as set forth in claim 1 wherein the mating surfaces of said bearing supporting cap members and arch portions are of substantially equal effective areas inwardly and outwardly of planes passing through the effective line-of-force axes of the several clamping bolts in parallel relation to the crankpin axis thereby equalizing the radial distribution of the compressive loadings imposed by the clamping bolts on these surfaces and preventing ovalizing deflection of said arch portions, cap members, and bearing segments.

3. In a structure as set forth in claim 1, said connecting rods each having an oil passage interconnecting the pivotal connection at its piston end and its arch-defined bearing supporting surface, each of said arch portions having a circumferentially extending groove opening on its bearing supporting surface and intersecting said bolt hole openings and the opening of said oil passage, said arch supported bearing segment and groove defining an oil distribution passage therebetween, the other of said bearing segments each having an oil receiving groove therein opening on the journal surface and extending circumferentially between the bolt hole openings therein, and said crankshaft having oil supply passage means therein including two passages extending diametrically of said crankpin in the plane of said grooves and bolt hole openings.

4. A connecting rod structure for connecting a piston to a crankshaft, said structure comprising a connecting rod pivotally connnectable at one end to said piston, the opposite end of said connecting rod defining a crankpin bearing supporting arch portion, a crankpin bearing supporting cap member mateable with said arch portion to define a cylindrical bearing supporting surface, said bearing cap and said arch portion having aligned bolt holes therein intersecting and defining openings in the bearing supporting surface of said cap member and arch portion, crankpin bearing segments supported by said bearing supporting surface, said bearing segments defining openings alignable with the bolt hole openings in said bearings supporting surface, clamping bolts mounted in said bolt holes and piloting said bearing cap member and arch portion in proper bearing supporting relation, said bearing openings permitting insertion and removal of said bolts in assembly and disassembly, each of said bolts having a shank portion extending through said arch and cap bolt holes and projecting therefrom, said shank portion having a longitudinally extending notch therein arcuately formed on a radius exceeding that of said bearing supporting bore, the arch projecting end of each bolt having a head thereon formed to index and non-rotatably key said bolt relative to said arch to maintain the notch in said bolt in spaced radial relation to the adjacent bearing supporting surface and the opening therein, the opposite end of each bolt projecting from said cap member and having external threads thereon, and nuts threaded on said last-mentioned bolt ends to clamp said bearing halves, said arch and bearing cap together on said crankpin.

5. A connecting rod structure as set forth in claim 4 wherein the mating surfaces of said bearing supporting cap member and arch portion are of substantially equal areas inwardly and outwardly of planes passing through the effective line-of-force axes of the clamping bolts in parallel relation to the crankpin bearing axis thereby equalizing the radial distribution of the compressive loads imposed by the clamping bolts on these surfaces and preventing ovalizing deflection of said arch portion, cap member, and bearing segments.

6. In a structure as set forth in claim 4, said connecting rod having an oil passage interconnecting the pivotal connection at its piston end with its arch-defined bearing supporting surface, said arch portion having a circumferentially extending groove opening on said bearing supporting surface and intersecting said bolt hole openings and the opening of said oil passage, said arch supported bearing segment and groove defining an oil distribution passage therebetween, the other of said bearing segments having an oil distribution groove therein opening on the journal surface and extending circumferentially thereof between the bolt hole openings therein, and said crankshaft having oil supply passage means therein including a passage extending diametrically of said crankpin in the plane of said grooves and bolt hole openings.

7. A connecting rod structure for connecting a piston to a crankpin carried eccentrically of the rotative axis of a rotatably mounted crankshaft, said structure comprising a connecting rod pivotally connectable at opposite ends thereof to the piston and crankpin, the crankpin end of said connecting rod defining an arch portion, a cap member mateable with said arch portion to define a cylindrical bearing supporting surface spacedly embracing said crankpin, said cap member and arch portion having aligned bolt holes therein intersecting and defining openings in the bearing supporting surfaces thereof, bearing segments interposed between said crankpin and said bearing supporting surface and having openings therein alignable with the bolt hole openings in said bearing supporting surface, clamping bolts mounted in said bolt holes and piloting said cap member and arch portion in proper bearing supporting relation, said bearing openings permitting insertion and removal of said bolts in assembly and disassembly, each of said bolts having a shank portion extending through said bolt holes and projecting therefrom, the arch projecting end of each bolt having a head thereon, nuts threaded on the opposite ends of each bolt tensively loading said bolts to clamp said bearing segments, arch portion and bearing cap member together on said crankpin, and the mating surfaces of said bearing segments, arch portion and cap member being so dimensioned as to substantially balance the clamping bolt forces applied thereto inwardly and outwardly of planes passing through the effective line-of-force axes of the bolts in parallel relation to the crankpin axis thereby equalizing the radial distribution of compressive loading of these surfaces and preventing ovalizing deflection of said arch portion and cap member and of said bearing segments.

8. In a structure as set forth in claim 7, said bolt shank portions each having a longitudinally extending notch therein and the head end of each bolt being formed to index and non-rotatably key said bolt relative to said arch to maintain the notch in said bolt in spaced radial relation to the adjacent bearing supporting surface and the opening therein, thereby shifting the effective line-of-force axes of said bolts radially outwardly to achieve said balanced force and mating surface relationships.

9. In a structure as set forth in claim 8, said longitudinally extending notches being arcuately formed on a radius exceeding that of said bearing supporting surface.

10. In a structure as set forth in claim 7, said arch portion having a circumferentially extending groove intersecting said bolt hole openings and opening on said bearing supporting surface to define an oil distribution passage with the arch supported bearing segment, the other of said bearing segments having an oil distribution groove opening on the crankpin journal surface thereof and extending circumferentially between the bolt openings therein, and said crankshaft having passage means associated therewith for supplying pressurized oil and including a passage extending diametrically of each crankpin in the plane of said grooves and openings.

11. A clamping ring connection for securing a first cylindrical member to a second cylindrical member, said connection comprising two arcuate clamping ring segments mateable with each other to define a cylindrical surface embracing said cylindrical members, the mating ends of said ring segments having aligned bolt holes therein intersecting and defining openings in said cylindrical surface, clamping bolts extending through said aligned bolt holes and piloting said ring segments in proper clamping relation, one projecting end of each bolt having a head thereon and nuts threaded on the opposite ends of each bolt tensively loading said bolts to clamp said ring segments together, and the mating end surfaces of said ring segments being so dimensioned as to substantially balance the clamping bolt forces applied thereto inwardly and outwardly of planes passing through the effective line-of-force axes of the clamping bolts in parallel relation to the axis of said cylindrical members thereby equalizing the radial distribution of the compressive loads imposed by the bolts on the mating end surfaces and preventing ovalizing deflection of said clamping ring segments.

12. In a structure as set forth in claim 11, said bolts each having an inwardly facing, longitudinally extending notch therein shifting the effective force axes of said bolts outwardly of the longitudinal axes thereof to achieve said balanced mating surface relationships.

13. In a structure as set forth in claim 12, said longitudinally extending notches being arcuately formed on a radius exceeding that of said cylindrical surface and maintained in radially spaced relation thereto.

14. A connecting rod pivotally connectable at one end thereof to a crankpin carried by and eccentrically offset from the rotative axis of a rotatably mounted crankshaft, the crankpin end of the connecting rod defining a bearing supporting arch portion, a bearing supporting cap member mateable with said arch portion to define cylindrical bearing supporting surfaces spacedly embraceable of the crankpin, the mating cap member and arch portion having aligned bolt holes therein intersecting and defining openings in the bearing supporting surfaces of said cap member and arch portion, crankpin bearing segments interposable between the crankpin and said bearing supporting surfaces and having openings therein alignable with the bolt hole openings in said bearing supporting surfaces, clamping bolts mounted in said bolt holes and piloting said cap member and arch portion in proper bearing supporting relation, said bearing openings permitting insertion and removal of said bolts in assembly and disassembly, said bolts each having a shank portion extending through said bolt holes and projecting therefrom, said shank portions each having a longitudinally extending notch therein, the arch projecting end of each bolt having a head thereon formed to index and non-rotatably key said bolt to maintain the notch therein in spaced relation to the adjacent bearing supporting surface and opening therein, the end of each bolt projecting from the cap member having external threads thereon, nuts threaded on said last-mentioned bolt ends and tensively loading said bolts to clamp said bearing segments, arch portion and bearing cap together on said crankpin, and the mating surfaces of said bearing segments, arch portion and cap member being so dimensioned as to provide substantially equal areas of engagement therebetween inwardly and outwardly of planes passing through the effective line-of-force axes of the several clamping bolts in parallel relation to the crankpin axis thereby equalizing the radial distribution of the compressive clamping distortion of these surfaces with respect to such planes thus preventing ovalizing deflection of said arch portion and cap member and the bearing segments mounted thereby.

15. In a structure as set forth in claim 14, said arch portion having a circumferentially extending groove intersecting the bolt hole openings and opening on its bearing supporting surface to define an oil distribution passage with the arch supported bearing segment, and the other of said bearing segments having an oil distribution groove opening on its crankpin journaling surface and extending circumferentially between the bolt openings therein, and said crankshaft having passage means associated therewith for supplying pressurized oil and including a passage extending diametrically of the crankpin in the plane of said grooves and openings.

References Cited in the file of this patent

UNITED STATES PATENTS

| | | |
|---|---|---|
| 1,637,979 | Angle | Aug. 2, 1927 |
| 1,815,445 | Noble | July 21, 1931 |
| 2,212,366 | Donaldson | Aug. 20, 1940 |
| 2,628,136 | Pittman | Feb. 10, 1953 |

UNITED STATES PATENT OFFICE

CERTIFICATE OF CORRECTION

Patent No. 3,069,926　　　　　　　　　　　December 25, 1962.

Carl S. Hoffman et al.

It is hereby certified that error appears in the above numbered patent requiring correction and that the said Letters Patent should read as corrected below.

Column 3, line 21, for "cam" read -- cap --; column 4, line 60, for "pink" read -- peak --.

Signed and sealed this 21st day of April 1964.

(SEAL)
Attest:
ERNEST W. SWIDER　　　　　　　　　　　　EDWARD J. BRENNER

Attesting Officer　　　　　　　　　　　　Commissioner of Patents